United States Patent [19]
Morrison

[11] 3,765,554
[45] Oct. 16, 1973

[54] SELF-LOADING TRUCK
[75] Inventor: George W. Morrison, Seal Beach, Calif.
[73] Assignee: Maxon Industries, Inc., Huntington Park, Calif.
[22] Filed: July 12, 1971
[21] Appl. No.: 161,683

[52] U.S. Cl.................. 214/302, 214/763, 214/765, 214/147 G
[51] Int. Cl............................................. B65f 3/02
[58] Field of Search.................... 214/302, 313, 775, 214/776; 180/77 H

[56] References Cited
UNITED STATES PATENTS
2,020,231  11/1935  Bell.................................... 214/302
3,342,358  9/1967   French et al........................ 214/302
3,563,137  2/1971   Graber et al........................ 214/763
3,506,149  4/1970   Gray.................................. 214/764
2,975,851  3/1961   Youmans et al.................. 180/77 H
3,014,344  12/1961  Arnot................................. 214/674
3,604,577  9/1971   Heilmeier ......................... 214/308
3,241,687  3/1966   Orloff................................ 214/147 G
3,339,763  9/1967   Caywood et al.................. 214/672
3,446,377  5/1969   Heinert.............................. 214/302

FOREIGN PATENTS OR APPLICATIONS
797,644  10/1968  Canada........................... 214/77 R Primary Examiner—Gerald M. Forlenza
Assistant Examiner—Lawrence J. Oresky
Attorney—W. D. Sellers et al.

[57] ABSTRACT

A self-loading truck having many uses and particularly suitable for transferring the contents of containers onto a truck and restoring the empty containers alongside the path of travel. Swivelling boom means operating in view of the truck driver and controlled by him while seated at the driver station includes both manual and semi-automatic controls for picking up containers from either side of the truck and emptying them into the cargo compartment by self-centering boom control means. The boom components are powered by pressurized fluid supplied by a driving engine which speeds up and resumes idling automatically during the cargo handling cycle. For trash handling operations, the power boom is supported on one forward corner of the truck chassis for swivelling movement crosswise of the truck in full view of the driver and operates to dump trash into the truck from containers resting at the curb on either side of the street.

10 Claims, 8 Drawing Figures

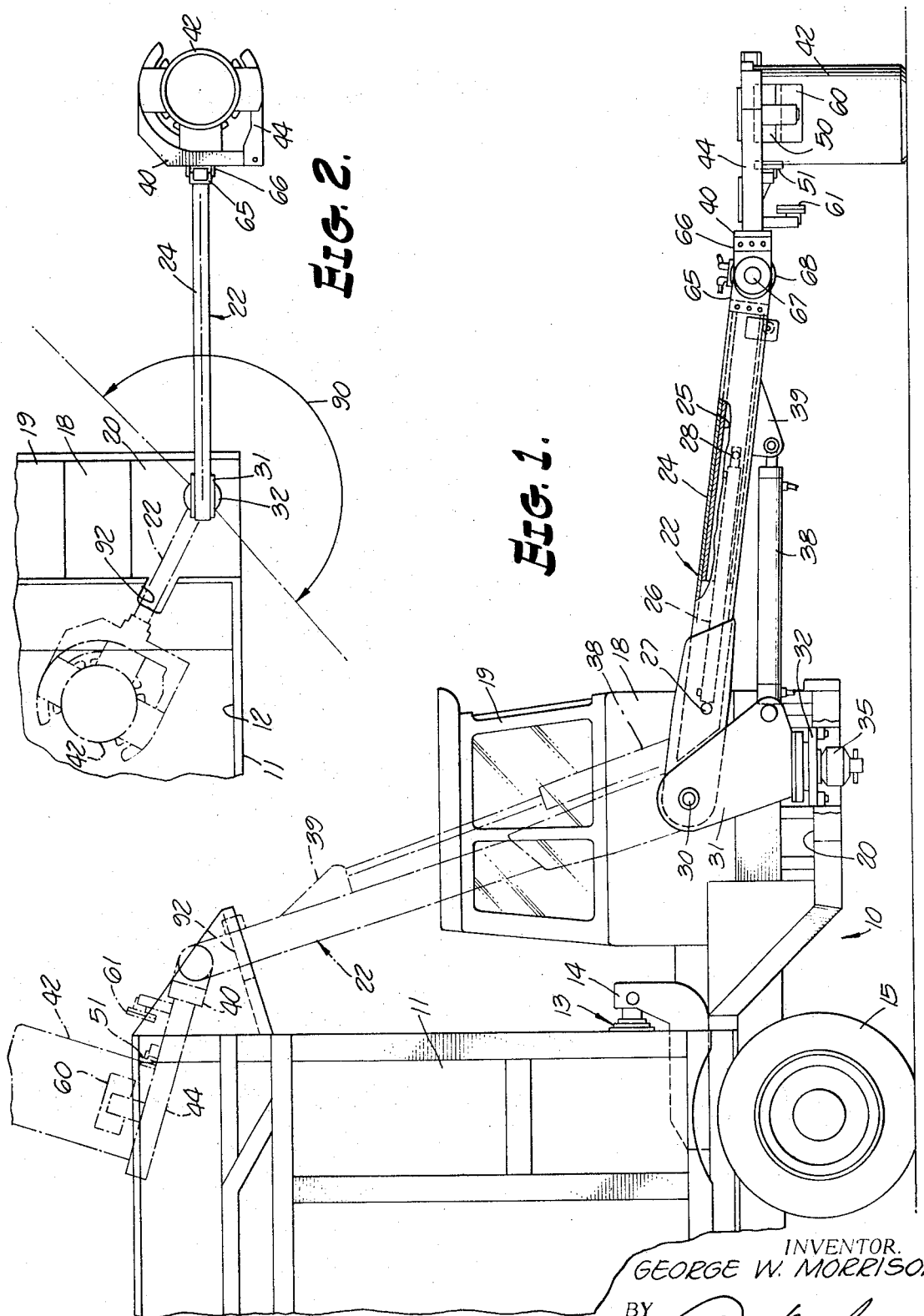

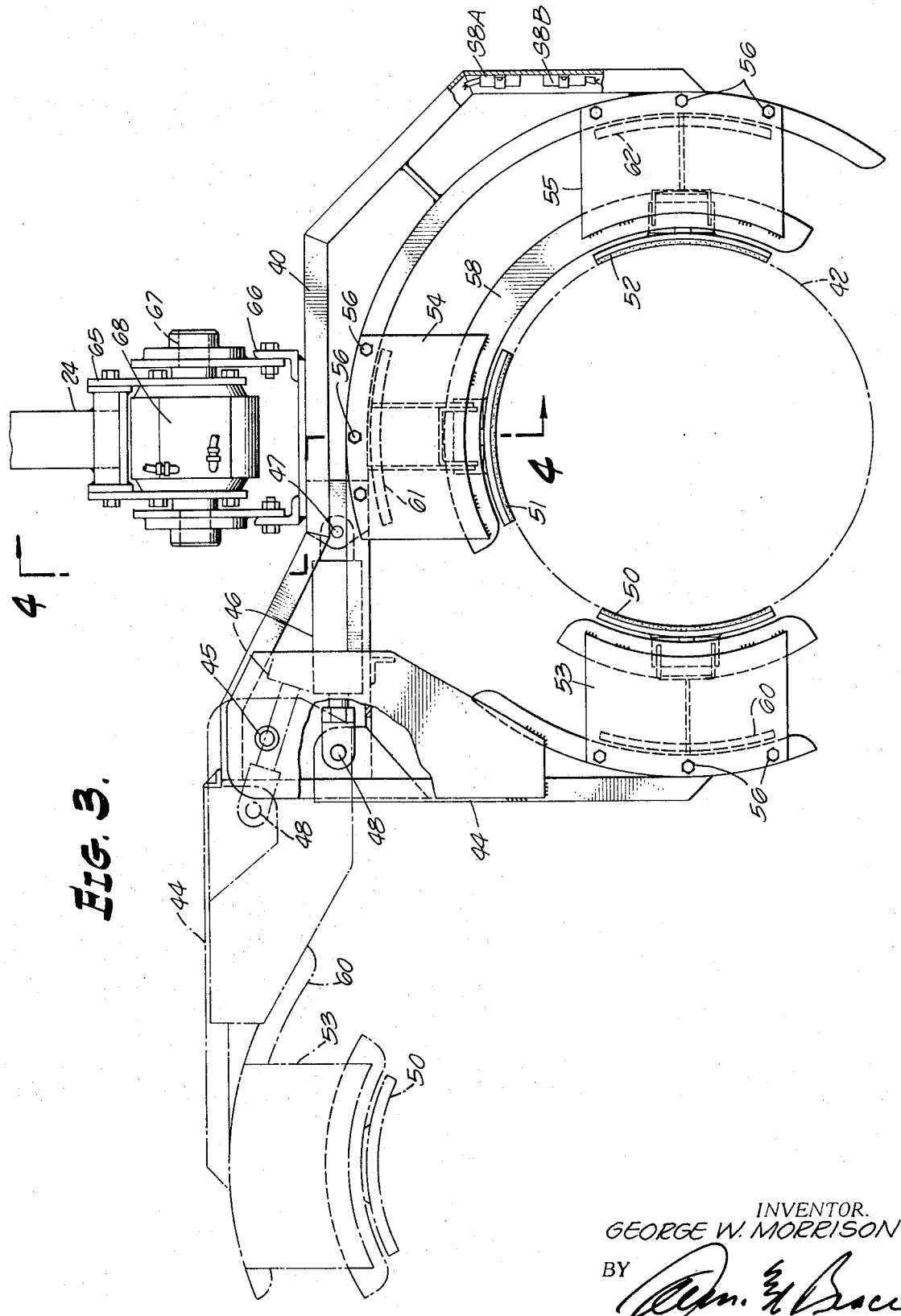

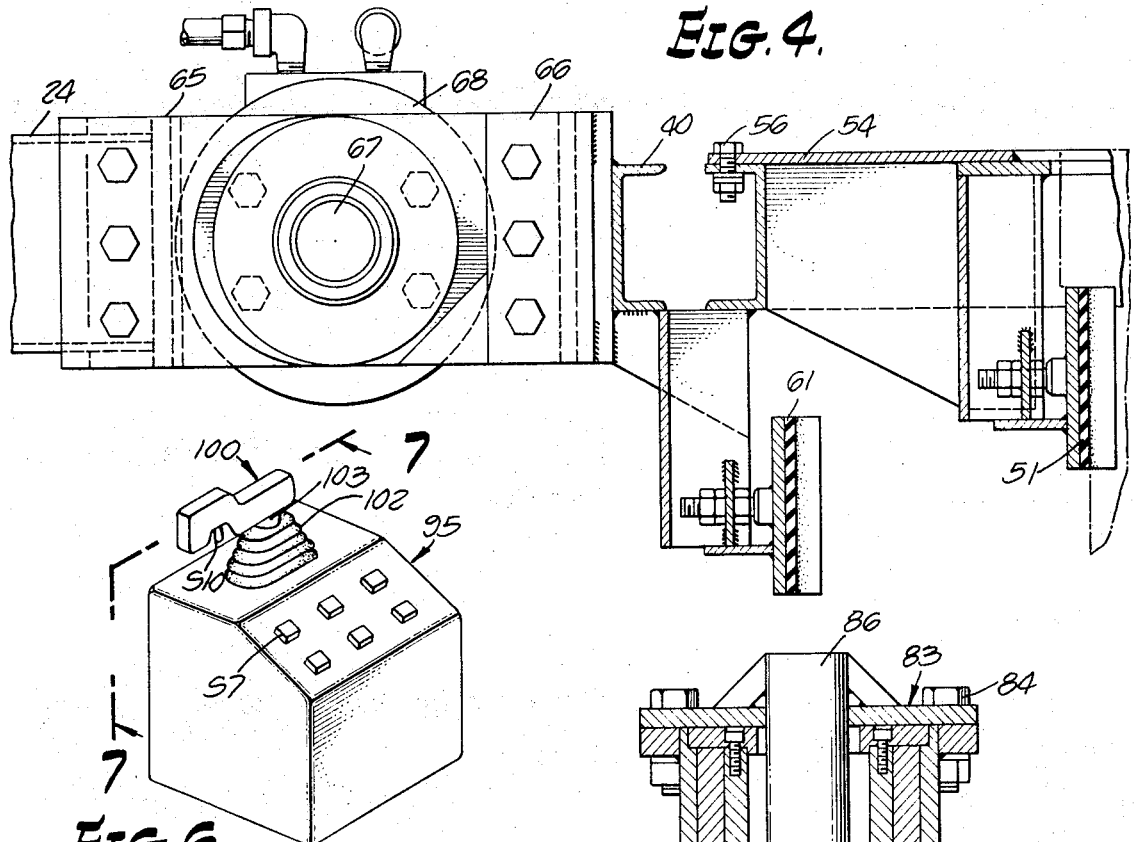
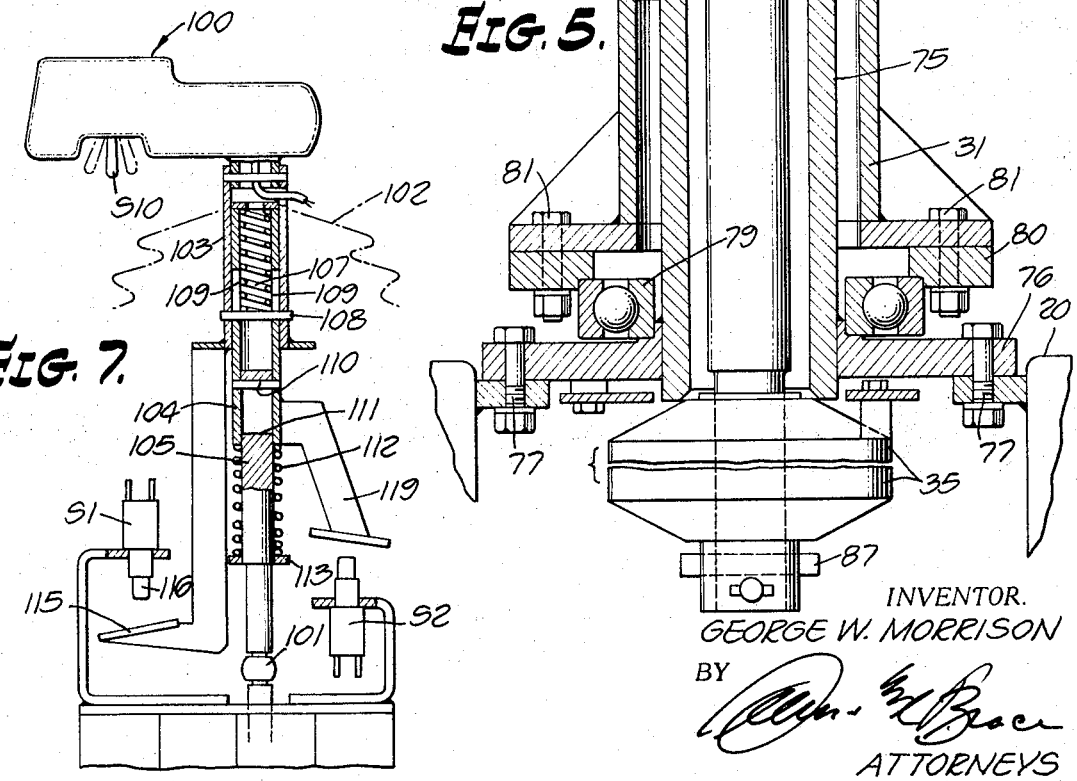

SELF-LOADING TRUCK

This invention relates to trucks, and more particularly to a truck equipped with unique self-loading means controlled by the driver seated at the driver's station and capable of picking up and dumping the contents of containers from either side of the street into the truck and returning the containers to curbside.

Many proposals have been made heretofore for cargo trucks with loading means mounted on the truck and powered either by the truck engine or by an auxiliary engine. Usually the loading means are mounted across either the front or the rear of the truck although certain proposals have been made for attaching the loader to some intermediate part of the truck. These loaders utilize various expedients for transferring cargo from ground level onto the truck and are subject to numerous shortcomings and disadvantages eliminated by the present invention.

For example, prior loaders customarily required a crew of men with each truck including a driver and one or more workmen who gathered the trash or the like and manipulated it onto the loading equipment after which the controls were actuated to elevate and deposit the trash onto the truck. In many cases, the trash must be lifted into bins, hoppers or other receiving receptacles which is then elevated to the top of the truck and overturned or otherwise manipulated to deposit the contents onto the truck. Other equipment makes use of power conveyor equipment for advancing the material from a low level into the truck.

A particularly complex and costly problem greatly simplified by the present invention is the collection of trash from residences and places of business. For the most part this material is bulky, light in weight with volumes of voids. The economical collection and handling of this material presents many frustrating problems which are greatly minimized by the present invention. A one-man crew suffices to drive the collection truck and to operate all controls without moving from his driving station. A swivelling pivoting boom equipped with unique jaw means is easily manipulated to pick up trash containers from either side of the street and to lift them to a self-centering dumping position following which the container is up-ended to dump the contents into the truck for compaction and stowage using conventional packer equipment. The empty containers are then returned to curbside.

The boom is controlled primarily by a joy stick type operator effective to move the outer end of the boom in or out, to the right or to the left and up and down depending upon the movement of the joy stick in these same directions, the operator simply moving his hand in the particular direction he wishes the boom to move. Alternatively, the boom may be operated automatically through the major portion of its cycle simply by pressing an automatic control button and holding it in this position until the desired portion of the automatic cycle has been completed.

The various reversible motors employed to operate the boom are actuated by pressurized fluid supplied by a pump powered from a driving engine. The control circuit for these auxiliaries responds automatically to their actuation to accelerate the engine so long as there is need for pressurized fluid and to restore it to idling thereafter. The automatic positioning means for the boom while in its container dumping position operates to center the boom automatically as it approaches dumping position thereby avoiding risk of damage to the equipment or dumping the container contents while misaligned with the truck inlet. The only portion of the cycle requiring reasonably close attention by the operator is that of engaging the container initially.

Accordingly it is a primary object of the present invention to provide a new and improved self-loading truck all operations of which are controllable by the driver while seated at his driving station.

Another object of the invention is the provision of a self-loading cargo truck manned and operated by a seated truck driver.

Another object of the invention is the provision of a cargo truck equipped with power driven boom means operating crosswise of the front of the truck and functioning to pick up containers from either side of the street and to transfer their contents onto the truck without need for workmen to touch the containers.

Another object of the invention is the provision of a trash pick up truck equipped with powered loading means for lifting trash containers from street level to a dumping position onto the truck and for then transfering the container back to curbside.

Another object of the invention is the provision of a truck having a cargo handling boom equipped at its outer end with container engaging means operable to hold the container upright while elevating it to a dumping position and thereafter upending the container to deposit the contents onto the truck before returning the empty container to the ground.

Another object of the invention is the provision of a container handling boom readily convertible to handle containers of different size.

Another object of the invention is the provision of a truck self-loader selectively controllable manually and automatically as respects a major portion of its operation.

Another object of the invention is the provision of a truck loading boom controllable from a joy stick arranged to drive the boom in the same direction of movement as taken by the joy stick.

These and other more specific objects will appear upon reading the following specification and claims and upon considering in connection therewith the attached drawing to which they relate.

Referring now to the drawing in which a preferred embodiment of the invention is illustrated:

FIG. 1 is a side elevational view showing one illustrative embodiment of the invention installed on a trash gathering truck and showing the self-loading boom lowered to engage a trash container and indicating in dot and dash lines the position of the boom while emptying the container;

FIG. 2 is a fragmentary smaller scale top plan view of the inner front corner of the truck shown in FIG. 1 and including the same full line and dotted line views of the loading boom;

FIG. 3 is a fragmentary top plan view on an enlarged scale of the outer end of the boom and including a dotted line showing of the container clamping jaw pivoted to its fully open position;

FIG. 4 is a fragmentary vertical sectional view taken along line 4—4 on FIG. 3;

FIG. 5 is a vertical sectional view on an enlarged scale of the swivelling assembly supporting the lower end of the boom means;

FIG. 6 is a perspective view of a suitable control console for the self-loading equipment suitably mounted adjacent the right hand of the operator while seated at the truck driving station;

FIG. 7 is a fragmentary view partly in section taken along line 7—7 on FIG. 6 showing details of the joy stick control for the self-loader.

Figure 8:
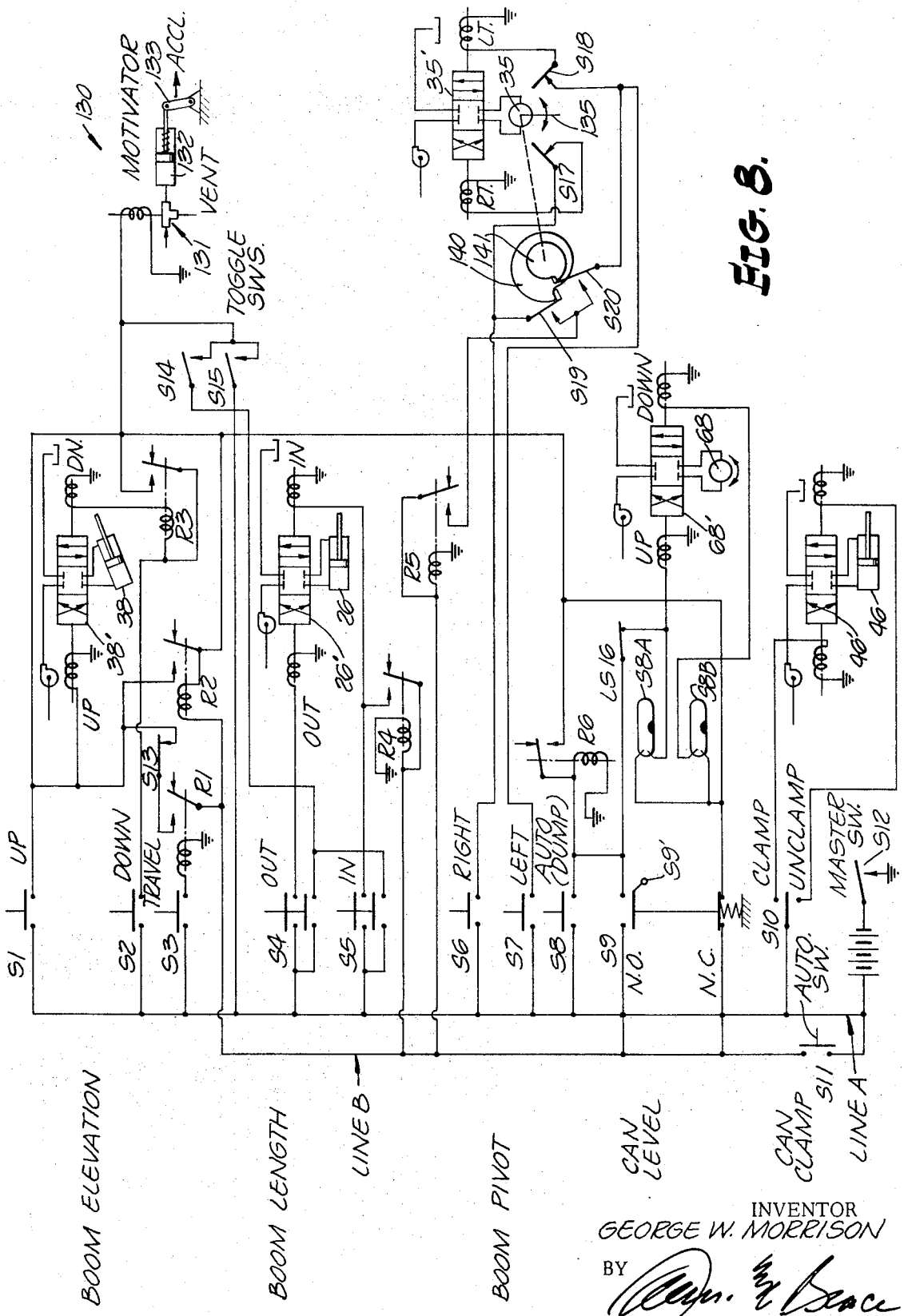
FIG. 8 is a schematic of the electrical and hydraulic control components for the self-loading boom.

Referring initially more particularly to FIG. 1 there is shown an illustrative embodiment of the invention mounted on the chassis of a trash pick up truck 10 having an enclosed trash storage chamber 11 and provided across its forward upper end with a trash inlet opening 12. It will be understood that the interior of compartment 11 is equipped with any suitable trash compactor equipment powered with a multi-state hydraulic ram 13 having its forward end pivotally connected to a bracket 14 rigid with the truck chassis.

The forward end of truck chassis 10 extends forwardly of the steerable front wheels 15 and may be stepped downwardly to provide a support for a longer boom and the truck engine enclosed within housing 18. The enclosed driver station 19 occupies the left hand forward corner of the chassis whereas the right hand forward corner 20 is reinforced and provides a support for swivelling boom means designated generally 22.

The main body of boom 22 comprises an outer tubular housing 24 telescopically supporting therein an inner tube 25 shown fully retracted by a double action cylinder 26. The lower end of cylinder 26 is pivoted to the interior of boom housing 24 by pin 27 whereas its forward end is similarly connected to tube 25 by pin 28.

The rear end of boom housing 24 is pivotally supported on a pin 30 mounted crosswise of the upper end of a strongly constructed yoke 31. The lower base end of yoke 31 is swivelly supported on a bearing plate 32 for movement about a vertical axis under the control of a reversible hydraulic motor 35. The details of the swivel support for yoke 31 will be described in greater detail presently in connection with FIG. 5.

The vertical pivoting movement of the boom is controlled by a double action hydraulic cylinder 38 having its rear end pivoted to yoke 31 and its forward piston rod end pivoted to a bracket 39 welded to the underside of boom housing 24. In its full line showing, cylinder 38 is fully retracted whereas the dot and dash line showing indicates the extended position of the cylinder with the boom elevated to its dumping position with respect to inlet 12 of the trash storage chamber.

Journalled crosswise of the outer end of the boom is a generally U-shaped frame 40 designed to pick up a container 42 for trash or other loose material to be loaded into the truck. One leg 44 of pick up frame 40 is pivotally connected to the remainder of the frame by pivot pin 45 (FIG. 3) and is operated by a double action hydraulic cylinder 46 having one end pivoted to the main frame at 47 and its other end pivoted to jaw 44 by pivot pin 48.

The container pick up frame 40 is readily convertible to handle containers of medium or very large size by the simple expedient of attaching or detaching a set of supplemental jaws 50,51,52. These jaws are loosely connected to brackets 53,54,55 the outer ends of which are held detachably assembled to main frame 40 and pivoting jaw 44 by cap screws 56. As herein shown, brackets 54 and 55 are interconnected by an arcuate connector 58.

When the smaller set of clamping jaws 50,51,52 along with their supporting brackets 53,54,55 are detached, the container pick up assembly 40 is adapted to pick up containers of much greater capacity utilizing the outer set of container clamping pads 60,61,62. These pads likewise have limited self-aligning movement in support brackets secured to jaw 44 and main frame 40.

Referring more particularly to FIG. 3, it will be understood that the container pick up main frame 40 is secured to the outer end of the boom tube 24 by pivoting knuckle means including a smaller and a larger yoke 65,66 held pivotally assembled by shaft 67 of a reversible hydraulic motor 68. It will be understood that frame 40 can be moved to or held in any desired pivoted position at the outer end of the boom by motor 68 and its control valving to be described below in connection with FIG. 8.

Referring now more particularly to FIG. 5, the variable axis swivel assembly for the lower end of boom 22 will be described. It will be understood that the bight portion of yoke 31 telescopes over an upright rigid shank 75 welded to an annular mounting flange 76 bolted to the truck frame by bolts 77. A ball-bearing race assembly 79 is mounted between flange 46 and a ring 80 secured by bolts 81 to the base of yoke 31. A thrust bearing assembly designated generally 83 is held assembled over the upper end of shank tube 75 by bolts 84. Extending downwardly through shank tube 75 is a large diameter shaft 86 of the reversible hydraulic motor 35. The upper end of shaft 86 is welded to the thrust bearing assembly 83 and its lower end is anchored to the chassis frame by a cross brace 87. It will therefore be clear that, depending upon the direction of the flow of pressurized fluid through motor 35, shaft 86 operates to pivot the entire boom assembly, including yoke 31, either to the right or to the left crosswise of the front end of the truck.

The permissible limit of pivotable movement of the boom is indicated by arrow 90 in FIG. 2 and is dependent upon the location of the boom with respect to other subassemblies on the front of the truck. As is indicated by the arrow in FIG. 2, this arc is approximately 180 degrees but can be increased by the simple expedient of locating yoke 31 further forwardly on the truck chassis.

The arc of vertical pivotal movement is likewise dependent on the location of the trash inlet 12 for storage compartment 11. As herein shown, the arc of upward pivotal movement is somewhat in excess of 100 degrees. The inlet 12 for the storage compartment preferably projects forwardly of the compartment proper to provide a larger hopper mount and its forward edge is notched, as is indicated at 92 in FIG. 2, to accommodate and guide the boom as it swings rearwardly toward dumping position. The edge of this notch may diverge toward the inlet end although this is not particularly necessary since the boom may be operated and accurately guided into dumping position by automatic means assuring that it will be properly positioned for entrance into the notch as it is being elevated.

CONTROLS

Referring now to FIGS. 6, 7 and 8, suitable controls for the self-loader will be described. In control console 95 there is a universally support joy stick 100 on a ball 101 enclosed within a flexible dirt guard bellows 102. The shank of the joy stick includes outer and inner tubes 103,104 having limited telescopic movement relative to one another and relative to the vertical rod 105 to which the ball joint 101 is secured. A compression spring 107 is mounted within the inner tube 104 with its upper end bearing against a stop fixed to this tube and its lower end bearing against a pin 108 having a friction fit with openings in tube 103. This pin has a loose sliding fit along aligned slots 109 in tube 104. Likewise, a second pin 110 has a press fit with tube 104 and extends loosely through an elongated slot 111 lengthwise of rod 105. Normally, pin 110 is held pressed against the upper end of slot 111 by a compression spring 112 encircling rod 105 with its upper end bearing against the lower end of tube 104 and its lower end bearing against a stop 113 fixed to rod 105.

From the foregoing it will be apparent that the hand grip at the upper end of joy stick 100 is held resiliently in a neutral position by springs 107,112. If the joy stick is pulled upwardly, spring 107 is compressed, whereas if it is pushed downwardly, spring 112 is compressed. When the joy stick is pulled upwardly, the L-shaped bracket 115 fixed to tube 103 engages and closes the normally open actuator button 116 of microswitch S1. Likewise if the joy stick is pushed downwardly, bracket 119 fixed to tube 104 engages and closes the operating button of the normally open microswitch S2. In like manner it will be understood that movement of the joy stick forwardly or backwardly as well as to the right or to the left of the truck, pivots the lower end of the joy stick into operating engagement with a respective normally open microswitch supported below the ball and socket 101 and to hold that switch in closed position so long as the joy stick is held in an appropriate position. Unless the joy stick is deliberately shifted away from its vertical neutral position to which it is biased by suitable means, all switches in its path of control will be in their normal neutral or open position.

Referring to FIG. 8, there is shown a schematic of the hydraulic and electrical controls associated with console 95 and joy stick 100. )t will be understood that switches S1,S2,S4,S5,S6,S7 are operable by joy stick 100. Each of these switches is a normally open microswitch and can be closed by appropriate manipulation of the upper end of the joy stick. For example, if the operator wishes the boom to move up he elevates the joy stick upwardly in opposition to the above described spring 107 until bracket 115 attached to the stick engages the operating button 116 of switch S1 (FIG. 7). Alternatively if he wishes to move the boom downwardly, he depresses the joy stick in opposition to spring 112 (FIG. 7) so that bracket 119 engages switch S2 and closes it.

Microswitches S4 through S7 are shown only in FIG. 8, but it will be understood they are positioned opposite the lower end 105 of the joy stick below its pivot 101, the double bladed switch S4 controlling extension of the boom being closed as the stick is moved forwardly, and the similar switch S5 controlling contraction of the boom being closed if the joy stick is pivoted in the opposite direction toward the rear of the truck. Microswitches S6 and S7 are closed depending on whether the joy stick is pivoted to the operator's right or left to swivel the outer end of the boom to the right or left hand side of the path of travel.

The double bladed switch has its upper blade normally open and its lower blade normally closed and effective to supply power to a pair of mercury switches S8A and S8B adjustably mounted as shown in FIG. 3 on the frame of the container pick up device 40. Switch S8A is normally opened whereas switch S8B is normally closed. These switches operate to control the reversible fluid motor 68 pivoting the container clamping jaws to the outer end of the boom as the boom is being elevated to keep the container in an upright position until it is in the position for dumping.

Switch S10 in the grip of the joy stick is a double throw toggle switch normally in an upright neutral position and which can be closed in either direction to operate the container clamping cylinder 46 controlling the pivotal movement of leg 44 of the pick up device 40. Thus as the switch is closed in one direction the jaw 44 pivots toward the container and if it is operated in the other direction the jaw pivots away from the container to release it. Desirably the jaw is equipped with a stop limiting its gripping movement to avoid risk of distorting the container.

Before proceeding with a detailed description of an operating cycle it will be understood that various ones of the switches control relays to power circuits some of which control the operation of conventional four-way valves blocking all flow to the associated motor when the valves are in their normal neutral position. The valve spools can be held in either of their extreme positions so long as a respective operating solenoid is energized. The control four-way valve for each motor is designated by the same reference character distinguished by a prime. For example, four-way valve 38' in the upper portion of FIG. 8 controls the operation of reversible motor 38 for elevating and lowering the boom. The pressurized inlet to this valve is shown as connected to the outlet of the fluid pressurizing pump whereas the fluid return conduit will be understood as connected to the fluid reservoir. Although a separate pump is shown associated with each valve it will be understood that a common pump is employed and driven by a power take off from a suitable engine.

Normally it is desirable that the truck engine be operating at a suitable speed while applying pressurized fluid to an operating component and this result is assured by an automatic motivator assembly 130 operable in response to a demand for pressurized fluid to open a three-way solenoid valve 131 to supply pressurized air to actuating cylinder 132 thereby to operate a linkage 133 connected to the engine accelerator. Thus, when solenoid 131 is energized motor 132 operates to advance the accelerator and increase engine speed while cutting off the atmospheric vent. When the solenoid is de-energized, a spring retracts the accelerator linkage to restore the engine to idling speed and to open the vent to the atmosphere from the spring-biased motor 132. The normally open toggle switches S14 and S15 will be observed as connected in circuit with solenoid 131 and these provide the operator with means for actuating the motivator manually at any time irrespective of other controls and irrespective of whether the boom is operating under automatic or manual control.

BOOM OPERATING CYCLE

Normally the truck travels with the boom fully retracted to the position indicated in dot and dash lines in FIG. 1, a position controlled by a normally closed limit switch S13 positioned to be engaged and opened as the boom reaches its travel position as switch S3 is held closed. The driver stops the truck rearwardly of a container 42 and, master switch S12 being closed, the main power lead A to each of the microswitches and other control components is energized. The system is now armed and in readiness to operate. Since the boom must first be lowered, the operator grasps the hand grip of the joy stick 100 and pivots it forwardly thereby closing switch S2 to energize relay R3 shifting the spool of four-way valve 38' to the right and supplying pressurized fluid to the upper end of boom operating cylinder 38. Fluid from the lower end of cylinder 38 escapes back to the reservoir and the boom continues to lower toward the position shown in FIG. 1. As soon as the boom moves away from its fully elevated position and from controls S9' of switch S9, switch S9 assumes its normal position shown in FIG. 8 thereby de-energizing relay R6 and placing mercury switches S8A and S8B in control of the container level control motor 68. In this manner the container supported in the clamping jaws 40,44 is automatically returned to and remains in an upright position during substantially the entire lowering operation of the boom.

During the lowering movement, the operator can swing the boom horizontally to the right or to the left simply by shifting the joy stick to the right or left while continuing to hold it in a forward position to maintain the boom lowering motor energized. If the stick is shifted to the left, switch S7 is closed to activate the left hand control solenoid for four-way valve 35' controlling boom swivelling motor 35. Should the operator maintain the joy stick to the left until the boom has swung to the limit of its leftward movement, arm 135 rigid with the shaft of motor 35 will contact the normally closed limit switch S18 to de-energize the "left" solenoid of four-way valve 35' allowing that valve to return to its neutral position. Likewise had the right hand solenoid been energized, the boom could continue to swing rightward until the associated right limit switch S17 opens. As the container comes to rest on the ground the operator operates toggle switch S10 on the hand grip of the joy stick in the direction to energize the opening solenoid of four-way valve 46' thereby admitting fluid to motor 46 (FIG. 3) to open jaw 44 and release the container.

If container 42 is filled with material desired to be dumped into the truck, the driver simply moves the truck forward until the open container pick up jaws 40,44 are astride the container whereupon he operates switch S10 on the hand grip of the joy stick in a direction to activate motor 46 to close jaw 44 against the container and then allows this switch to return to its neutral position as he pulls the joy stick backwardly to close the boom "up" control switch S1. When this occurs power is supplied to the "up" solenoid of valve 38' thereby admitting pressurized fluid to the lower end of cylinder 38 (FIG. 1) to elevate the boom. As soon as the container is off the ground, the operator can pivot the joy stick to the left since this is necessary to bring the outer end of the boom, as shown in FIG. 2, to a proper dumping position relative to the truck inlet 12. Switch S7 is thereby closed to energize the "left" solenoid of valve 35' controlling the boom swivelling motor 35, as was true when closing other of the boom operating switches.

Once the container has been engaged, the remainder of the elevating and material dumping cycle may be carried out automatically by closing the automatic switch S11 conveniently located on the control console 95. Switch S11 may be spring biased to its open position and held closed by depressing the switch until the container has been dumped. So long as switch S11 remains closed, bus line B is energized. In consequence, relay R2 is energized to supply power to the "up" solenoid of valve 38' controlling boom elevating motor 38. At the same time power is supplied via relay R2 to solenoid valve 131 activating the motivator to speed up the truck motor. Likewise power is supplied from bus B to relay R4 closing that relay and supplying power to valve 26' driving motor 26 to retract the boom should it be in any extended position.

Another lead supplies power from bus B to energize relay R5 thereby supplying power to microswitches S19 and S20 associated with a pair of cams 140, 141 fixed to the shaft of boom rotating motor 35. As shown in FIG. 8, the boom motor is rotated to a position in which the boom is aligned with notch 92 (FIG. 2) wherein it is properly positioned to dump the container into the storage compartment. In these circumstances, both of the switches S19 and S20 are in open position and energized relay R5 is ineffective to supply power to either solenoid of valve 35' for motor 35. However, if the boom happens to be misaligned in any degree and in either direction from its dumping position, then the associated high portion of either cam 140 or 141 will hold the appropriate one of switches S19 or S20 closed until the misalignment has been corrected. If the boom requires rotation slightly to the right to be in alignment with notch 92, then switch S19 will be in closed position to supply power through closed switch S17 to the right hand solenoid for valve 35'. Accordingly, fluid will be supplied to rotate the boom until the actuator for switch S19 rides off the high side of cam 140 permitting this switch to open and deactivate the motor. A similar operation will occur if the boom needs to be rotated to the left.

During elevation of the boom, power supplied through the normally closed contact of switch S9 supplies power to the self-levelling switch S8A and S8B to rotate the container levelling motor 68 in the direction and as necessary to maintain the container in an upright position. When the boom is fully elevated, the boom will contact the actuator S9' for switch S9 and shift this switch to its alternate position closing its normally open contacts, and opening its normally closed contacts. Upon closing of the normally open contacts, power is supplied from bus line B to energize relay R6 and supply power in a path bypassing the levelling switches S8A and S8B and in a manner energizing the "up" coil of the valve for levelling motor 68'. Accordingly, this motor continues to rotate the container against a stop opposite its full dumping position.

At the end of the dumping cycle the operator releases or opens the automatic switch S11 and manipulates the joy stick to return the boom to its down position so that the container is returned to its original position on the ground in an upright position. If the operator prefers to carry out the entire operation using his manual controls, he leaves the automatic switch S11 open and manipulates the joy stick as described above. As the boom approaches notch 92 at its dumping position, it is guided into the inner end of the notch and as it approaches the container dumping position, the boom engages button S9' to close switch S9 supplying power from bus line A through switch S16 to bypass the mercury levelling switches to energize the "up" solenoid for motor 68 so that the contents of the container are dumped into the truck.

While the particular self-loading truck herein shown and disclosed in detail is fully capable of attaining the objects and providing the advantages hereinbefore stated, it is to be understood that it is merely illustrative of the presently preferred embodiments of the invention and that no limitations are intended to the detail of construction or design herein shown other than as defined in the appended claims.

I claim:

1. An engine-powered self-loading trash truck driven and loaded by the truck driver while seated in a truck driving station, said truck having a chassis with a pair of steerable front wheels and a pair of engine-driven rear wheels supporting the respective ends of a large trash storage chamber having a top inlet, a driving station and a boom supporting station forwardly of said steerable front wheels on the opposite forward corners of said chassis, extendable boom means supported close to street level at one forward chassis corner and in full view of the driver seated at said truck driving station, driver controllable power means for extending and pivoting said boom means horizontally in the lowered position thereof crosswise of the forward end of said truck and including means to pick up an unattached trash container at ground level from either lateral side of said truck, power means for pivoting said boom means and a trash container carried thereby upwardly and rearwardly, and power means on said boom means for thereafter upending a trash container and dumping its contents into said storage chamber inlet.

2. A self-loading truck as defined in claim 1 characterized in the provision of a manually operable control means for said boom means beside a seated driver in said driving station and normally biased to a neutral position, said control means including means manually shiftable in opposite directions along three axes at right angles to one another, said control means including switch and control means operatively connected to the respective ones of said power means operable to extend and retract said boom means and to pivot it in either direction about the vertical and horizontal axes thereof and corresponding to the direction in which said manually shiftable means is shifted.

3. A self-loading truck as defined in claim 2 characterized in the provision of manually operated switch means and associated means connected to the power operating means for said boom means and operable when activated by the operator to operate said boom means through an automatic cycle which includes retraction of the boom, pivoting the boom horizontally in either direction to a preselected position, pivoting the boom vertically upward to a preselected container dumping position, and thereafter upending a container to dump its contents into said storage chamber inlet.

4. A self-loading truck as defined in claim 3 characterized in that said means for upending a trash container includes reversible motor means and container level control sensing means for maintaining a container upright while being elevated to dumping position, and means for deactivating said level sensing control means and for activating said container upending power means in a direction to dump a container when the container is in a preselected elevated position opposite said storage chamber inlet.

5. A self-loading truck as defined in claim 1 characterized in that said power means for upending a trash container includes reversible motor means and container level control sensing means operable to drive said container upending motor means in either direction as necessary to maintain a container generally upright while being elevated to said storage chamber inlet.

6. A self-loading truck as defined in claim 5 characterized in the provision of means for deactivating said level control means automatically as said boom means reaches a dumping position at said storage inlet and for activating said container upending power means to dump the container contents into said inlet.

7. A self-loading truck as defined in claim 1 characterized in the provision of hydraulic pump means driven by said truck engine to supply pressurized fluid to operate each of said power means for said boom means.

8. A self-loading truck as defined in claim 7 characterized in the provision of means responsive to the actuation of said power means for said boom means to increase the fuel supply to said engine so long as said boom means is in operation and for restoring said fuel supply to engine idling requirements when said boom means is not in use.

9. A self-loading truck as defined in claim 1 characterized in that said container pickup means includes a pair of power-operated clamping jaws for gripping and releasing a trash container supported on the outer end of said boom means by reversible motor means having a horizontal axis and operating to rotate a container in a vertical plane about said motor axis.

10. A self-loading truck as defined in claim 9 characterized in the provision of container level control sensing means for operating said motor means to maintain a container upright until elevated above said storage chamber inlet, and means responsive to the arrival of a container to said upending position to deactivate level control means and utilizing said motor means to upend a container and dump the contents thereof into said storage chamber inlet.

* * * * *